United States Patent [19]

Daringer et al.

[11] Patent Number: 5,590,755

[45] Date of Patent: *Jan. 7, 1997

[54] WOVEN-WIRE BELT WITH VERTICALLY-ORIENTED LATERAL EDGES AND CONVEYANCE METHODS AND APPARATUS

[75] Inventors: Ronald G. Daringer, Cambridge; Stephen D. Wilcox, New Market, both of Md.

[73] Assignee: Maryland Wire Belts, Inc., Church Street, Md.

[ * ] Notice: The term of this patent shall not extend beyond the expiration date of Pat. No. 5,375,695.

[21] Appl. No.: 363,332

[22] Filed: Dec. 23, 1994

Related U.S. Application Data

[63] Continuation-in-part of Ser. No. 56,875, May 5, 1993, Pat. No. 5,375,695.

[51] Int. Cl.⁶ ................................................. B65G 21/18
[52] U.S. Cl. ............................................ 198/778; 198/848
[58] Field of Search ................................. 198/848, 778

[56] References Cited

U.S. PATENT DOCUMENTS

| | | | |
|---|---|---|---|
| 2,292,663 | 8/1942 | Scherfel | 198/848 X |
| 3,202,387 | 8/1965 | Andrews et al. | 198/848 X |
| 3,276,570 | 10/1966 | Hale et al. | 198/848 |
| 3,300,030 | 1/1967 | Scherfel | 198/848 |
| 3,348,659 | 10/1967 | Roinestad | 198/136 |
| 3,542,188 | 11/1970 | Kinney, Jr. | 198/848 |
| 4,036,352 | 7/1977 | White | 198/848 X |
| 4,866,354 | 9/1989 | Miller | 198/778 X |
| 5,176,249 | 1/1993 | Esterson et al. | 198/848 X |
| 5,191,267 | 3/1993 | Machacek | 198/778 X |
| 5,375,695 | 12/1994 | Daringer et al. | 198/848 X |

*Primary Examiner*—D. Glenn Dayoan
*Attorney, Agent, or Firm*— Shanley & Baker

[57] ABSTRACT

Method of manufacturing, assembling and fabricating a woven-wire belt with unitary vertically-oriented lateral edge flattened-wire helically-wound surfaces along each lateral edge for dynamic-frictional drive of the belt by a rotatable substantially-cylindrical drive surface in a helically-curved path, free of any mechanical drive connection while in the helical path. Lengthwise-directed tension control of the belt is exercised, while the belt is exterior to the helically-curved path, to achieve desired frictional drive contact within the drive surface. An exterior travel path for the belt between exit from and return to the helically-curved path provides an endless belt travel array. Increasing belt movement from the helically-curved path to the exterior travel path is used to increase lengthwise-extended tensile stress in the outer perimeter of the belt, while in the curved path; the increase in tensile stress in the outer perimeter increases constrictive force transferred to the inner perimeter of the belt so as to increase dynamic-frictional drive force along the inner perimeter of the belt which is in contact with the rotatable substantially-cylindrical drive surface.

14 Claims, 6 Drawing Sheets

WOVEN-WIRE BELT WITH VERTICALLY-ORIENTED LATERAL EDGES AND CONVEYANCE METHODS AND APPARATUS

This application is a continuation-in-part of U.S. application Ser. No. 08/056,875, filed May 5, 1993, entitled CURVED-PATH WOVEN-WIRE BELT AND CONVEYANCE METHODS AND APPARATUS now U.S. Pat. No. 5,375,695.

The present invention relates to an improved method of manufacturing a woven-wire belt for selective control of the load-carrying capabilities during dynamic-frictional drive operations in a helically-curved travel path.

More particularly, the present invention is concerned with selective control of dynamic-frictional drive and load-carrying capabilities of woven-wire conveyor belts while maintaining a substantially horizontal orientation in a helically-curved travel path.

Conveyor arrangements had previously been restricted as to the type of belt which placed limitations on use in helically-curved path structures. The present invention provides for manufacture and assembly of woven-wire belts of selected characteristics, teaches methods for readily achieving differing load conveying capabilities in a helically-curved travel path in which the belt is driven solely by dynamic-frictional contact and, also, provides for varying frictional-drive force so as to accommodate differing loads while diminishing the effect of tensile stress in a woven-wire belt.

Advantages in commercial conveyance and work product treatment enable increased selective use of lengthwise-directed tension in woven-wire belts, decreased fatigue stressing of such belts, and increased service life of woven-wire belts used in helically-curved travel path arrays.

The above and other contributions and advantages are considered in more detail in describing principles and specific embodiments of the invention with reference to the various views of the accompanying drawings, in which:

FIG. 1 is a cross-sectional view of a flattened surface wire configuration preferred for carrying out the present invention;

FIGS. 2 and 3 present, respectively, a helically-wound spiral and loop configuration characteristics which are utilized in carrying out the invention;

Figure 5:
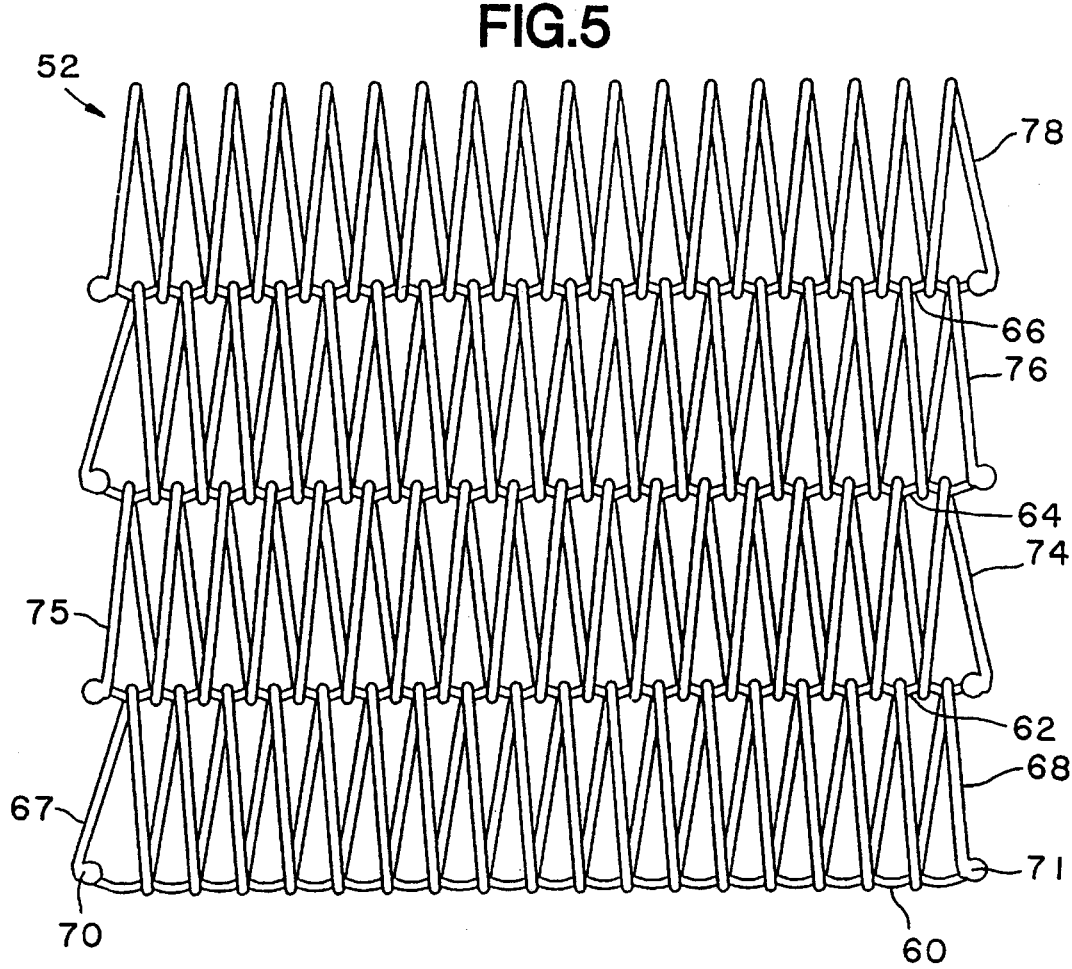
FIG. 5 is a plan view for describing initial steps in the assembly of a woven-wire belt in which helically-wound spirals and elongated prefabricated connector rods are joined to form integral units providing for relative movement during laterally-curved belt travel.
Figure 8:
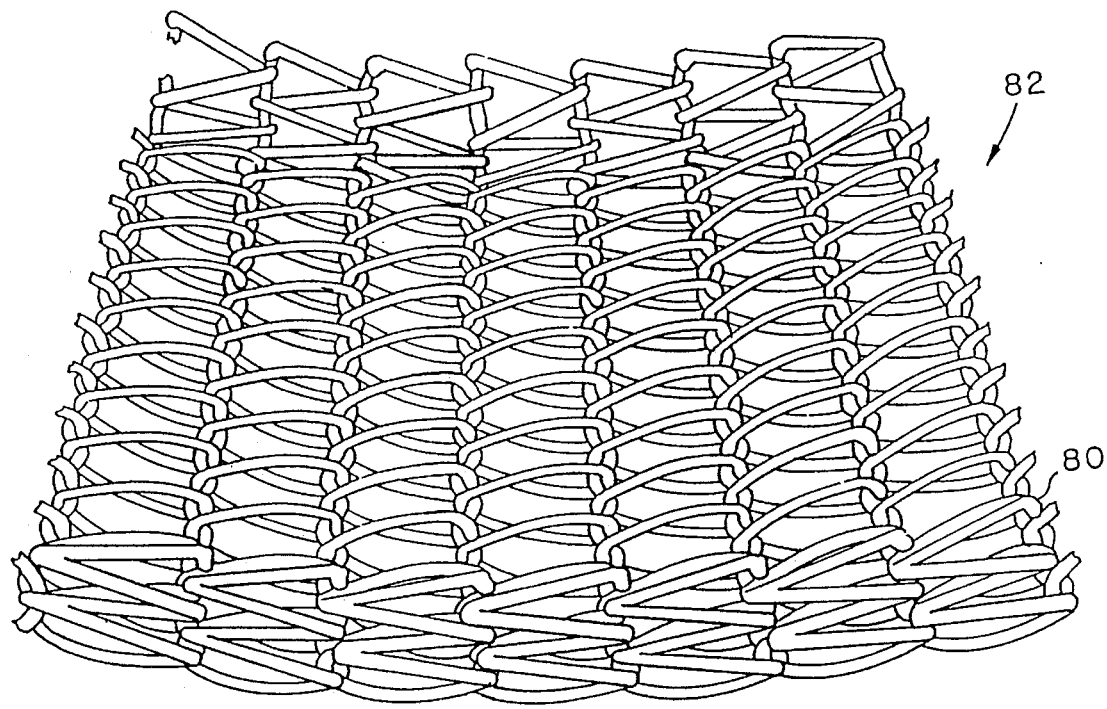
Figure 9:
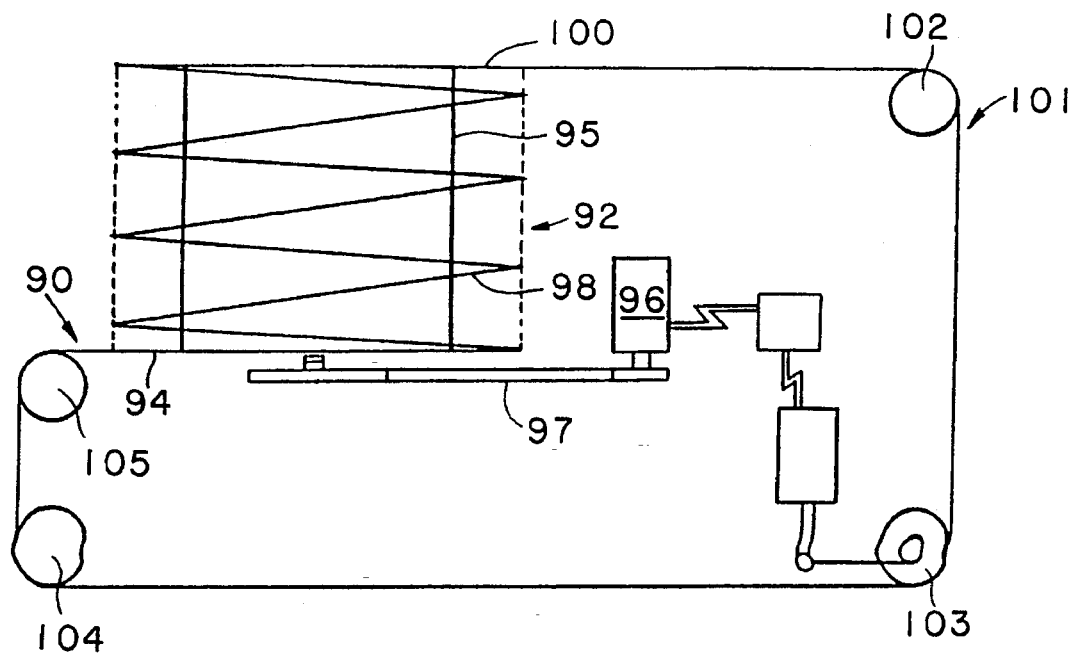
Figure 10:
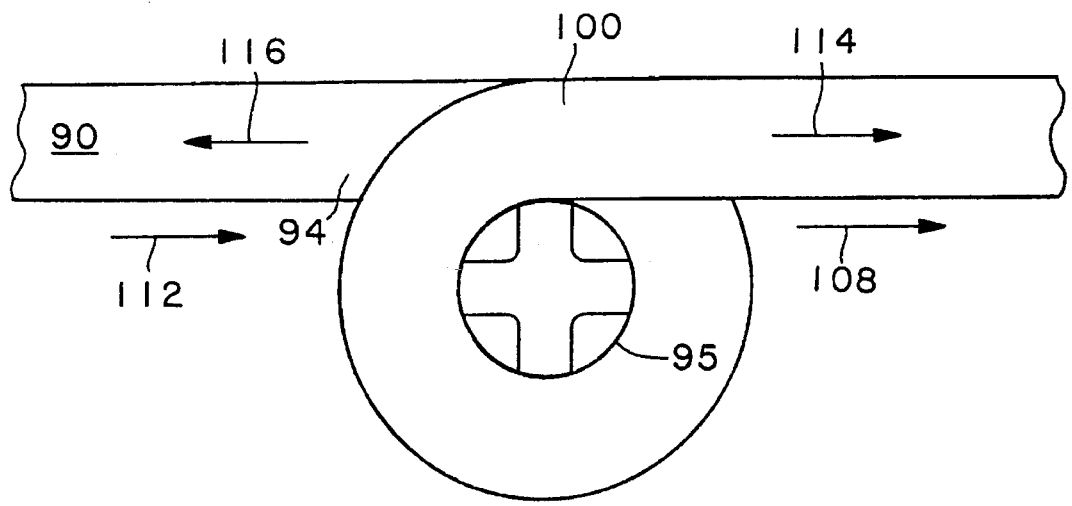
Figure 11:
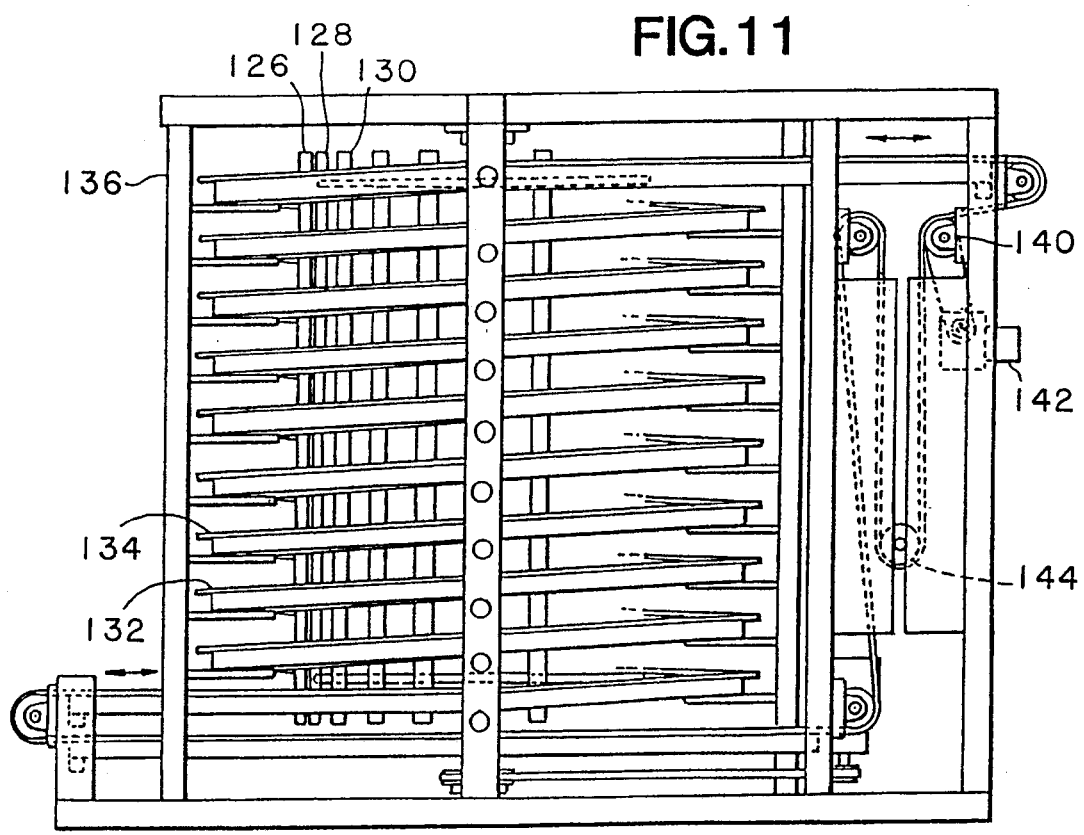
Figure 12:
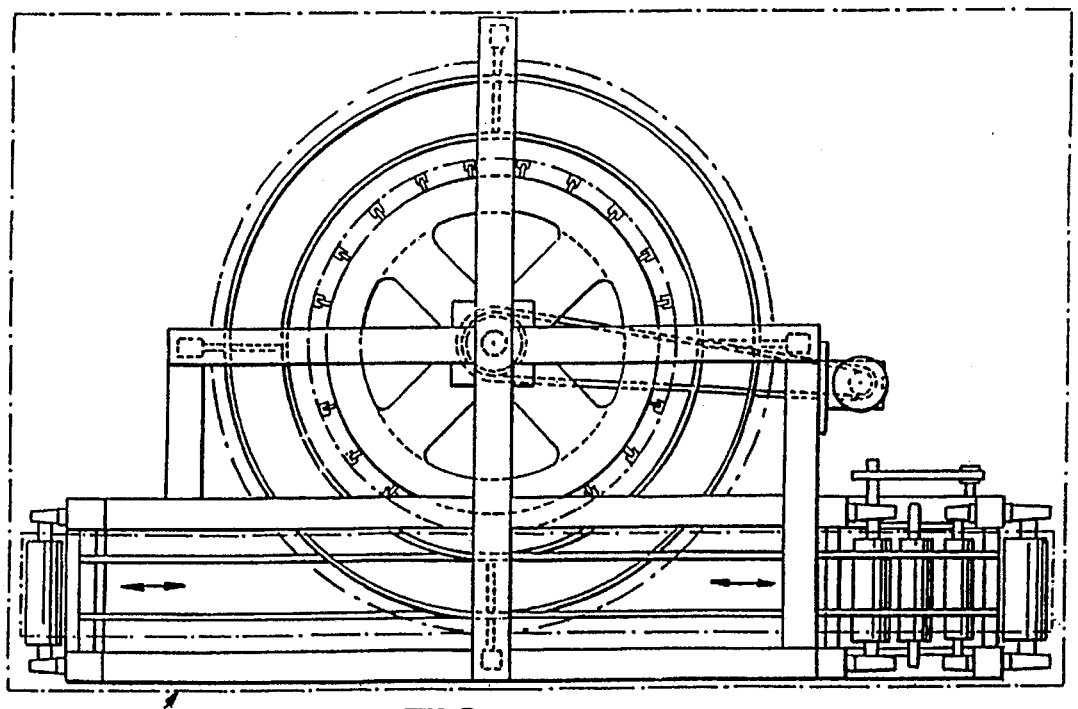

FIG. 8 is a side elevational view for describing fabrication along each lateral side of a belt assembled as shown in FIG. 5 in which helically-wound loops and associated connector rod portions are turned to present vertically-oriented flattened-surfaces along each lateral side at the belt which increase tensile strength of the belt for purposes of increasing load capacity for dynamic-frictional drive in the helically-curved path;

FIG. 9 is a schematic general arrangement view of a rotatable cylindrical-configuration drive structure and a helically-curved support path for a woven-wire belt for describing dynamic-frictional drive force control features of the invention;

FIG. 10 is a schematic view of a portion of FIG. 9 for describing increasing lengthwise tension in a woven-wire belt while in a linear path extension to the helically-curved path of FIG. 9 to increase load conveying capacity by dynamic-frictional drive of the belt in such helically-curved path;

FIG. 11 is an elevational side view, including portions in section, for describing methods of assembly and operation of a helically-curved travel path tower, with a belt travel path exterior to the helically-curved path for describing control features in an endless belt travel array in accordance with the invention, and FIG. 12 is a top plan view, with portions in section, of the structure shown in FIG. 11.

The woven-wire belt and helically-curved conveyance concepts and methods of the present invention require no mechanically interconnecting components to drive the belt in a helically-curved path, and provide selections for increasing work product load conveying capabilities in a defined helically-curved travel path.

The present invention relies on dynamic-frictional drive along an inner perimeter edge of a woven-wire belt during helically-curved travel about a substantially-cylindrical configuration drive source. The range of load capacities for dynamic-frictional drive of a woven-wire belt in a helically-curved path is increased by predetermined selections of belt component configurations and characteristics.

Figure 1:
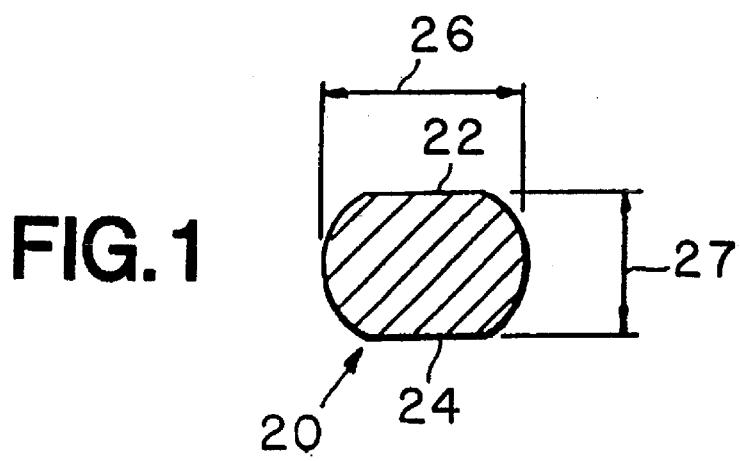
Figure 2:
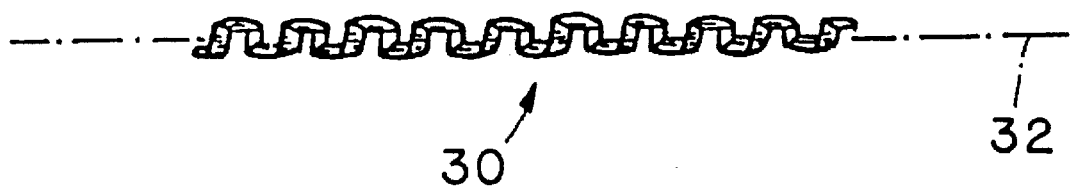
Figure 3:
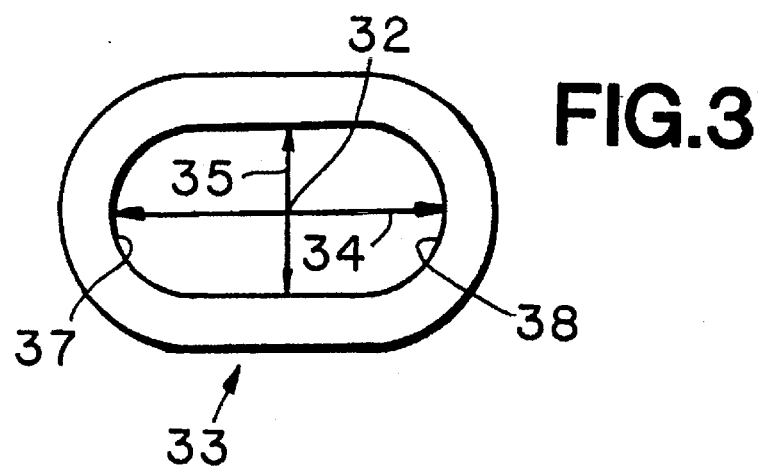

Metal wire of preselected gage is preferably shaped as shown in FIG. 1 and then helically-wound into an elongated spiral, as shown in FIG. 2, for practice of the invention. Such elongated spirals comprise helically-wound loops of uniform cross-sectional dimensions and configuration (as shown in FIG. 3); which are uniformly distributed along the centrally located axis of the spiral shown in FIG. 2.

Metal wire 20 is shaped as shown in FIG. 1 to be flat on at least two diametrically opposed surfaces; for example, "upper" surface 22 and "lower" surface 24. Round metal wire of uniform diameter (gage) is flattened such that the dimension shown at 26 is preferably from about 1.1 to 1.25 times the original round metal wire diameter, and the dimension shown at 27 is between about 0.75 to 0.90 times such original metal wire diameter.

During fabrication, the flat surfaces 22 and 24 are disposed as the outer and inner surfaces, respectively, of the helically-wound loops of elongated spiral 30; such loops are uniformly distributed along centrally-located axis 32 (FIG. 2).

Helically-wound loops of the invention preferably have an elongated-oval toroidal configuration (33) as shown in cross section (FIG. 3) in a plane which is perpendicularly transverse to the centrally located axis of a spiral. Each such elliptical loop configuration is uniformly spaced along and symmetrically disposed, in cross section, with respect to the centrally located axis (32) of the spiral.

The elliptical configuration defines a major axis 34 and minor axis 35 as seen in cross section in FIG. 3. The interior configuration of each loop presents a bight end 37, 38 respectively at each opposite end of major axis 34 within the elliptical cross section. The loops can be shaped to have a more rectilinear configuration in the direction of the minor axis at each bight end and, also, along the major axis legs as shown in FIG. 4.

Figure 4:
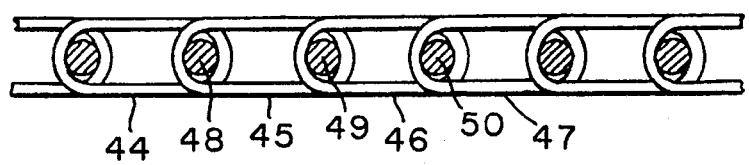
FIG. 4 is a schematic view, partially in cross section, for describing the relationship of woven-wire belt components of the present invention.

Longitudinally contiguous pairs of spirals, such as 44–45, 45–46, 46–47, etc. of FIG. 4, are interlinked using connector rods, such as 48, 49 and 50, with a single connector rod inserted within overlapping bight ends of each contiguous pair of spirals. The elongated spirals and connector rods extend laterally across the full width of the belt and the major axis legs of the spiral loops extend in the general lengthwise direction of a belt being assembled (as best seen in FIG. 5).

Figure 6:
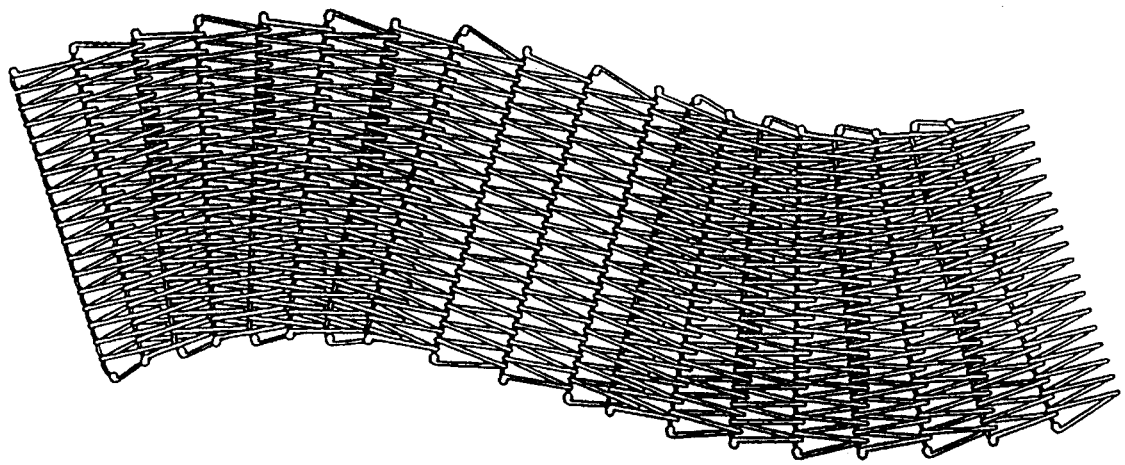
FIG. 6 is a plan view of the woven-wire belt of FIG. 5 for describing such relative movement of lengthwise contiguous integral units which is incrementally graduated across belt width during substantially horizontally-oriented travel into, through and out of laterally-curved travel paths.
Figure 7:
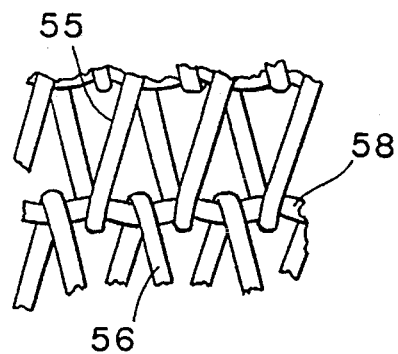
FIG. 7 is a schematic plan view of a portion of a woven-wire belt for describing a preferred connector rod configuration for use in the invention.

The loops of the spirals can be wound in the same direction ("unidirectional")—that is, all left-hand or all right-hand. In the embodiment of FIGS. 5–7, a "balanced weave" is shown. Referring to FIG. 7, right-hand wound spirals (such as 56) and left-hand wound spirals (such as 55) alternate in the lengthwise direction of assembly of the belt. Pairs of lengthwise contiguous spirals (whether in a unidirectional or a balanced weave) are woven together by a connector rod (such as 58).

As taught herein, the loops of the woven-wire belt have a uniform "pitch"; that is, the same number of loops per unit length along the centrally located axis of the spiral. A relatively open weave is shown in FIGS. 5–7 in order to facilitate describing the method of belt assembly and achieving desired relative movement of the belt components in relation to each other in a helically-curved travel path. The so-called "mesh" size can be diminished to accommodate the size of the work product to be conveyed.

Significant contributions of the invention relate to expanding the range of useful applications of both woven-wire belts and helically-curved travel path structures. The selection of belt component configurations and dimensions, and other belt characteristics made available for selection in fabricating woven-wire belts, enable an increase in the useful range of application of such belts and curved path structures.

Referring to FIG. 4, during assembly of woven-wire belts of the invention, a connector rod (such as 48) is located in the overlapping bight end of a loop of overlapping contiguous spirals (such as 44, 45). The internal configuration dimensions, in particular the major axis dimension of the loops and selection of the gage of the connector rods, are factors in quantitatively determining available relative movement of belt components and to what extent the woven-wire belt can be "collected" along its inner perimeter when moving in a helically-curved path. Such factors are significant in establishing a range of load capacities, as described in relation to later figures.

Fabrication and assembly of integral units are depicted by the plan view of belt 52 of FIG. 5. It should be noted that connector rods (such as 60, 62, 64 and 66) have been prefabricated with a uniformly undulating configuration along the length of each. That configuration provides a seating location, with angled guidance into that location, for each loop of the associated helically-wound spiral across belt width. Those seating locations are uniformly spaced along the length of each elongated connector rod in a manner corresponding to the uniform distribution of helically-wound loops along the length of the elongated spirals. Those locations, formed by "crimping" a rod, facilitate orderly seating of helically-wound loops and orderly movement of loops of adjacent spirals in relation to each other during lengthwise collection along the inner perimeter in a laterally-curved path (FIG. 6). Such connector rod crimping also facilitates orderly subsequent lengthwise return of helically-wound loops to their original linear travel location.

Referring to FIG. 5, joining a single rod, such as 60, and a single spiral, such as 67, forms an integral unit 68 of the belt being assembled. The rod and spiral are made unitary by welding or brazing at lateral distal ends 70, 71. Integral unit 68 is pivotally connected to the next lengthwise adjacent integral unit 74, which consists of connector rod 62 and helically-wound spiral 75. That assembly of lengthwise contiguous integral units, with integral unit 74 being pivotally interconnected to integral unit 76, and integral unit 76 being pivotally connected to integral unit 78, continues throughout the desired length of the belt.

During movement of a belt into a laterally-curved travel path, contiguous integral units move relative to each other so as to be at least partially-collected as depicted in FIG. 6.

The relative-movement interaction of FIG. 6, is important for the selections taught by the invention for dynamic-frictional driving installations. Selecting the metal or metal wire gages for connector rods and spirals, selecting configurations and dimensions for the helically-wound loops, in particular the internal major axis dimension, and selecting the prefabrication crimping of the connector rods, are important in predetermining quantitatively to what extent a woven-wire belt, as fabricated and assembled, can be collected and extended in an orderly manner while remaining substantially horizontally-oriented; and, also, for determining and/or increasing the range of load conveying capacities of such a woven-wire belt in a helically-curved path.

Each of the integral units of FIG. 5 is pivotable about the connector rod of the next lengthwise adjacent integral unit. That pivotal relationship enables travel from a substantially-planar linear path to a differing substantially-planar linear path; for example, by movement from a horizontal path around cylindrical support rolls to a vertical path. That type of belt travel, in which the belt is essentially fully extended across its width, is an entirely different type of curvilinear travel than the helically-curved belt travel referred to in describing the invention.

In the present invention, the woven-wire belt, initially assembled as shown in FIG. 5, is then further fabricated to present vertically-oriented flattened-surface major axis loop portions along each lateral side of the belt for helically-curved travel. Those vertically-oriented helical loops are shown at lateral side 80 of woven-wire belt 82 in FIG. 8. In practice, preferably three or more such loops are turned to be vertically-oriented along each lateral side of the belt.

Each such vertically-oriented edge is fabricated by turning helically-wound loops of the spiral and associated connector rod portions along each lateral side of a woven belt assembled as shown in FIG. 5. Such turning of belt components continues along the length of each lateral side of the belt so as to present a vertically-oriented lateral edge surface of preselected vertical dimension in angled relationship to the remaining work product load-carrying surface of the woven-wire belt. For purposes of the invention, that is for increasing the lengthwise-directed tensile strength of the belt, the vertically-oriented edge portions can be directed upwardly or downwardly with respect to the load-carrying surface; or one edge can be directed vertically above and the other vertically below such surface.

In accordance with present teachings, each such lateral edge portion is fabricated to be in substantially right angled relationship to the load-carrying surface; and, each such vertical edge is a unitary portion of the woven wire belt, not a separately connectable or articulated means.

The invention enables dynamic frictional drive to take place by relative-movement contact along a lateral edge of the belt with a rotatable substantially-cylindrical surface. Any previous requirement for specially-interconnected longitudinal drive components for laterally-curved path travel is eliminated. And, the novel combination of selections relating to belt components and their assembly, along with control features exercised when the woven-wire belt is exterior to such a laterally-curved path, facilitate dynamic frictional drive in a helically-curved path and add to the conveying capabilities in such helically-curved path.

Reference is made to FIGS. 9 and 10 for explaining the principles and control features of the invention. As shown schematically in FIG. 9, a woven-wire belt 90 enters helically-curved path 92 at entrance level 94. A rotatable cylindrical-configuration drive surface 95 (in the form of a vertically-disposed drum) is driven by motor 96 using linkage indicated at 97. Stationary belt support tracks, such as 98, are uniformly-spaced along the height of the drum, as better seen in FIG. 11.

Support tracks such as 98 are independent of the rotatable drive drum 95 throughout its height. No mechanical connection with woven-wire belt 90 exists in the helically-curved travel path; support is provided for the belt between entrance level 94 and exit level 100.

A travel path for woven-wire belt 90, which is exterior to the helically-curved path, is shown schematically in FIG. 9. That exterior path 101 is at least partially defined by rolls 102,103,104 and 105, in which linear planar path movement of the belt provides for return to the helically-curved path.

Belt 90, with vertically-oriented lateral edges (as shown in FIG. 8) is collected (as shown in FIG. 6) along the inner perimeter of the helically-curved travel path. Such collection is initiated at entrance level 94 and extends through the helically-curved path to the exit level 100.

Dynamic-frictional drive force on the inner perimeter of a woven-wire belt in the helically-curved path is increased by increasing the constrictive (or gripping) force along such inner perimeter surface on the rotatable substantially-cylindrical configuration drive surface (95).

In addition to the selections of woven-wire belt component characteristics, which increase the use applications for each of a variety of woven-wire belts, control of the lengthwise tension in a belt is used to further increase the range of loads that can be handled by woven-wire belts operating about a circumferential dimension which is generally predetermined for a particular helically-curved path tower structure.

A woven-wire belt, as taught herein, is collected along its inner perimeter, and that inner perimeter collection is incrementally decreased gradually across the width of the belt to its outer perimeter. Belt component configurations and dimensions are preselected such that the outer perimeter of the woven-wire belt in the helically-curved path is under lengthwise-directed tension, i.e., tensile stress. It should be noted as part of present woven-wire belt conveyor teachings, lengthwise-directed tensile stress cannot be established in collected portions of a belt, and lengthwise-directed tensile stress established in the outer perimeter of the belt is relied on for purposes of controlling dynamic-frictional drive force. Also, lengthwise-directed tensile-stress is readily increased to increase work product load capacity in the helically-curved path.

The invention provides for a selection of belt component configurations and dimensions which provide the desired collection on the inner perimeter while assuring extension at the outer perimeter of the belt under lengthwise-directed tensile stress. And, the force of that tensile stress is transferred as a constrictive force, acting through the connector rods, which causes the inner perimeter lateral edge of the belt to exert a constrictive force on the rotatable drum surface, for dynamic-frictional drive in the helically-curved path of the load being conveyed.

The vertically-oriented lateral edge belt surfaces are important for increasing the range of acceptable tensile stresses for practical operation of a system. In addition to contributions by selecting belt component (rod and spiral) metals and metal gages, practical tensile strength increases for load conveying purposes in a helically-curved path are significantly increased by increasing the number of loops selected for vertical orientation along edge portions, as described above.

The mass of the metal along the outer perimeter of the helically-curved path is increased by the increasing number of helically-wound loops turned to form the vertically-oriented belt edges. With significantly greater mass, the acceptable level of tensile stress along the outer perimeter of the belt is significantly increased, as is the constrictive force on the inner perimeter to enable carrying of increased loads in a helically-curved path. But, also, such increase in metal mass decreases the tensile strain during usage, thereby decreasing fatigue in the metal and increasing service life of the belt.

Controlling movement of the belt exiting from the helically-curved path is used to control lengthwise-directed tension in the belt and, thereby, tensile stress in the outer perimeter of the belt in a helically-curved path. Increasing that tensile stress increases the gripping force for dynamic-frictional drive purposes, on the rotatably driven drum surface 95, as described above. Movement of the belt out of the helically-curved path is controlled by drive means in the belt travel path exterior to the helically-curved path; surface-driven rolls or pin-rolls, for example, can be selected dependent on belt size, for use in such exterior travel path for control of such movement.

Referring to FIG. 10, movement of the belt from drum 95 along exit level 100 in the direction indicated by arrow 108 determines the longitudinal tension and the extent of the belt tightening in its helically-curved travel path on rotatable drum 95. The floating roll 144, shown in FIG. 11, removes any slack in the belt during its return travel to the helically-curved path, such that the lengthwise-directed tension existing in the belt at entrance 94 is less than that being exerted at exit level 100. Belt travel direction at entrance level 94 is indicated by arrow 112. The direction of lengthwise-directed tension in belt 90 at exit level 100 is indicated by arrow 114; the direction of lengthwise-directed tension in belt 90 at entrance level 94 is indicated by arrow 116.

Present concepts enable the belt to be frictionally driven selectively in either direction of its length. More specifically, the change in direction using dynamic frictional drive concepts does not require any change in methods and structure along the lateral side drive surface.

Helically-curved travel path tower structures, as shown in FIGS. 11 and 12, are enclosed, as indicated by interrupted line 120 in FIG. 12, for purposes of thermal treatment, or for selected gaseous atmosphere treatment with or without controlling temperature, or for radiation treatment, and/or for other treatment processing of formed parts. For example, powdered metal or powdered ceramic parts of complex shape can be subjected to sintering heat treatment in a controlled gaseous atmosphere while traveling in a helically-curved path.

The invention enables a wide selection of belts and dwell times within a single helically-curved path structure by varying linear speed of the belt and/or through use of the readily reversible features. Also, multiple helically-curved path tower structures can be connected in tandem; for example, the exit path at an upper level of the tower shown in FIGS. 11 and 12 can be directed to a second helically-curved travel path tower structure in which the belt is driven downwardly to return the treated articles to the level at which they were introduced into the first tower.

The periphery of a rotatable cylindrical driving surface defines the inner periphery of the helically-curved belt travel path. A solid cylindrical surface may be preferred when formed from ceramic. Also, use of solid surface cylinders can be more practical for small-diameter drive sources. However, the disposition of individual drive elements 126, 128, 130 in a cylindrical configuration (FIGS. 11, 12) has certain advantages in manufacture and cost. The vertically-oriented belt edges, described earlier, help to avoid belt vibration during dynamic-frictional driving using such individually separate drive elements as shown in FIG. 11.

Defining a substantially cylindrical configuration drive surface for the helically-curved path should not exclude a slightly tapered surface, as viewed in a plane which includes the axis of rotation of the drum, between entrance and exit paths.

Lateral edge contact surfaces of the belt, as well as circumferentially-disposed drum elements, such as 126, 128, 130, can be selectively coated for desired frictional characteristics.

The curved path drive source is centrally located in the enclosure structure of FIGS. 11 and 12. Also, the enclosure can be decreased to the more limited space, occupied substantially completely by the helically-curved track support structure itself, for special treatments at high temperature or the like. Exterior travel path rotatable elements can be located within such an enclosure, but motors, and especially motor controls, are located outside the enclosure.

A plurality of helically-curved belt support tracks, such as 132, 134, are located along support frame members, such as 136, as shown in FIG. 11.

The drum-defining drive contact surface travels at a differing rate of movement than the belt being driven. Preferably for dynamic frictional drive purposes of heavy work product loads, the peripheral rate of movement of the drum is a multiple from about two to about five tenths faster than the rate of movement of the vertically-oriented inner-perimeter contact surface of the belt being driven. Such relative rates of movement provide the "dynamic" character of the frictional drive. The described vertically-oriented lateral edges of the woven-wire belt with three or more helical loops facilitate uniformity of drive force along the drum configuration.

During movement of the belt externally of the helically-curved path, as shown in the embodiment of FIGS. 11 and 12, the belt is directed by a series of guide and/or support rolls. Removal of the belt from the helically-curved path is controlled by roll 140, driven by drive motor 142, so as to produce desired lengthwise-directed tension in the belt for dynamic-frictional drive purposes in such curved path.

Roll 144 is a float roll which takes out slack in the belt due to lengthwise expansion. While the belt is being driven in the helically-curved path by the dynamic-frictional contact of the belt with the rotatable drum surface, movement of the belt over rolls exterior to such curved path is carried out in a manner as described in relation to FIGS. 9 and 10, with the lengthwise direction tensile stress in the outer perimeter of the belt being transferred through the connector rods for exerting a constrictive force by the inner perimeter of the belt against the drive surface.

The following data relate to woven-wire belt components and helically-curved support structure of the specific embodiments of FIGS. 11 and 12:

| | |
|---|---|
| Belt length | 110 feet |
| Drum configuration diameter | 26 inches |
| Number of circumscribing turns | 9 |
| Belt speed (feet per minute) | about 1 to about 40 FPM |
| Drum speed (revolutions per minute) | about ¼ to about 20 RPM |
| Belt width | about 4" to about 10" |
| Drum drive motor (96) | ¼ hp |
| External belt movement motor (142) | ¹⁄₁₆ hp |
| Metal wire spirals (gage) (ASME J-304 stainless steel) (steel or other wire alloy, aluminum, brass, coated steel, or other suitable conveyance wire material) | 24 to 6 |
| Rods (gage) (ASME J-304 stainless steel) (steel or other wire alloy, aluminum, brass, coated steel, or other suitable conveyance wire material) | 22 to 4 |
| Helical Loops | |
| Major axis length | about ¼" to 4" |
| Minor axis (depth) | about ⅛" to 1" |

In practice, selecting the number of helically-wound spiral loops in vertically-oriented belt edges enables a greater selection of diameters for rotary driven surfaces, which increases the selection of helically-curved support and tower structures. Prototype woven-wire belts with belt widths as narrow as one inch for operation on a 3.75' diameter drum, using twenty-two gage rods and twenty gage spirals with ¼ lateral edge height, extend to belt widths as wide as ten feet operating on forty-foot diameter drums, using number four gage belt components. Such wide range of woven-wire belts set forth above, and as included in the tabulated data relating to a specific tower structure embodiment do not exhaust the range of possibilities when using the principles of the invention.

However, considering existing commercial uses of linearly elongated woven-wire belt conveyor structures, a tower structure can be equipped and operated to enable separate processing of a wide range of work product; that is, work products of widely differing weights (specific gravities) and/or widely differing sizes. With the present invention a single woven-wire belt, or a small number of belts, can be devised to cover such a wide range of work products utilizing a predeterminedly fixed drum surface diameter.

In manufacture and operation, a vertically-oriented edge comprising at least three helical loops is preferred and a rate of movement ratio of one point two to one (drum surface to belt inner perimeter); belt component wire gages from sixteen to six gage steel wire can accommodate a wide range of weights per linear foot of belt for a given drum radius.

In general, in devising a belt for a wide range of weights, a shorter major axis length for the helically-wound loops is preferred to a longer major-axis length, which may also be suitable. The factor involved in such a preference is that the smaller major axis loops provide for a greater number of connector rods per linear foot of belt length. And, therefore, the constrictive force of lengthwise-directed stress in the outer perimeter is transferred over a greater number of rods to the inner perimeter. Another advantage of a wide range of selections of belt components and characteristics is to enable a more economical belt selection to cover the range of work product, or other requirements, for a commercial user of a given curved-path tower structure.

Specific values, materials and dimensions have been set forth for purposes of describing the invention. It is to be understood that those skilled in the art, in the light of above teachings of principles of the invention, can devise embodiments other than as specifically illustrated and described; therefore, reference shall be made to the appended claims for purposes of determining the scope of the present invention.

We claim:

1. Method for manufacturing an elongated woven-wire belt to enable selective increase of load-carrying capabilities in a helically-curved travel path while being driven by dynamic-frictional contact with a substantially-cylindrical drive surface along the inner perimeter of the belt, comprising providing a plurality of elongated spirals formed by helically-winding wire shaped so as to present flattened internal and external surfaces for each of the helically-wound loops along the length of each elongated spiral, the helically-wound loops being uniformly distributed along, and in symmetrical cross-sectional relationship with, a centrally-located axis of each elongated spiral, each such loop having an elliptical configuration in a cross sectional plane which is perpendicularly transverse to such spiral axis, the elliptical loop configuration having a major dimension between bight ends of each loop and a minor axis dimension in perpendicular relationship to such major axis, with each such loop presenting:

major axis leg portions extending in the lengthwise direction of the belt being assembled between bight ends of such elliptical configuration, and minor axis leg portions at each bight end of such configuration, such minor axis legs extending between upper and lower surfaces of such elliptical configuration;

providing elongated metal connector rods of substantially uniform gage, each having an undulating configuration along its length defining a plurality of individually-recessed seat locations uniformly spaced along the length of each elongated connector rod;

interlinking connector rods and contiguous spirals along their lengths, by placing a pair of elongated spirals such that internal configurations of the respective loops overlap at one bight end of each of the loops, such overlap extending along the length of each spiral, each such spiral being capable of receiving a pair of connector rods, one such rod to be joined at its distal ends to respective distal ends of a single spiral to form an integral unit consisting of a spiral and a connector rod, with the remaining connector rod of such pair being interlinked with helical loops of, and having its distal ends joined to, the next lengthwise contiguous spiral, which has its helically-wound loops in overlapping relationship with corresponding loops of its next adjacent spiral so as to pivotally interconnect an additional integral unit to such first formed pivotally-interconnected integral unit, such pivotal interconnection of lengthwise contiguous integral units enabling curvilinear movement of the woven-wire belt being assembled from one substantially planar linear path around a cylinder-like configuration to another substantially-planar linear path, continuing such assembly of lengthwise adjacent pivotally interconnected integral units to establish a woven-wire belt of desired length;

such assembled belt defining a pair of oppositely-disposed substantially-planar surface areas extending in the lengthwise direction of assembly, each such surface area being defined by flattened major axis external surfaces of helically-wound loops of such spirals of the pivotally interconnected integral units;

joining distal ends of the connector rods and spirals along each lateral side of the belt forming such pivotally-interconnected units defining a substantially uniform width of woven-wire belt as lengthwise-disposed in a substantially-planar form, with major axis leg portions of the spiral loops being disposed in the lengthwise direction of the belt, and minor axis portions at bight ends of such loops being disposed in transverse relationship between the oppositely-disposed surface areas of such belt, and then, turning portions of the assembled belt, including helically-wound loops of the spirals and associated connector rod portions along each lengthwise-directed lateral side of the belt, to present flattened-surface major axis portions of such helically-wound loops in a substantially vertically-oriented lateral edge surface along each such lateral side of the belt, each such vertically-oriented lateral edge surface being in substantially perpendicular relationship to the planar surface defined by flattened major axis leg portions across the remaining width of the belt, between such lateral sides, which define a work product conveying surface area for such belt.

2. The method of claim 1, further including predetermining dynamic frictional drive capabilities along the inner perimeter lateral-edge turned portion of a woven-wire belt in a helically-curved travel path by preselecting lengthwise-directed tensile strength characteristics along the remaining lateral edge portion of such belt.

3. The method of claim 1, further including selecting the load conveying capabilities of such a woven-wire belt in a helically-curved travel path by:

selecting the metal and metal-wire gage of spiral and connector rod components for manufacture of the woven-wire belt and, in combination, selecting at least two helical loops from each spiral along the length of each lateral side of the belt which are turned from such planar form of initial belt assembly to present the vertically-oriented lateral edge along each lateral side of the work product carrying surface of the belt.

4. The method of claim 3, further including selecting the major axis dimension of the helically-wound loops of the spirals used in such belt, and selecting the gage of the metal connector rods for such belt, so as to:

selectively control available lengthwise collection of an assembled belt due to relative movement of such interconnected integral units in relation to each other along the inner-perimeter lateral side of the belt, and incrementally across its width, when the assembled belt is in such helically-curved travel path, such lengthwise collection being selected to provide for the outer perimeter of the belt being under tensile stress as the belt is driven by dynamic friction in a helically-curved travel path by contact with a rotatable substantially-cylindrical drive surface of predetermined diameter.

5. The method of claim 1, in which at least three helically-wound loops of each spiral along each lateral side of such a belt are turned to form such vertically-oriented lateral edge along each lateral side of the belt, and further including selecting characteristics of connector rod and spiral components to provide a range of load-carrying capabilities and to provide the desired collection along the inner perimeter of such belt when in a predetermined diameter helically-curved travel path, with selection being made from the group consisting of:
(a) the weight of the belt by selecting the metal and wire gages of connector rod and spiral components,
(b) the configurations of the connector rods and spirals to determine the number of connector rods per linear foot of belt length,
(c) the number of helically-wound loops along the length of each spiral,
(d) the number of helically-wound loops which are turned to form the vertically-oriented edge surface along each lateral side of the belt, and
(e) selected combinations of (a) through (d).

6. The method of claim 4, in which the number of helically-curved loops turned along each side to form its respective lateral edge surface, is selected in the range of three to about six, and further including fabricating the connector rods so as to be crimped in a uniform manner along their respective length dimensions so as to facilitate pivotal action of interconnected integral units by providing access to a recessed seat location along each rod length for receiving a single bight end of each helically-wound loop of the overlapping spiral of the next adjacent integral unit in the lengthwise direction of the woven-wire belt.

7. The method of claim 5, including preselecting metal connector rods which are crimped to provide recessed locations along their lengths to help maintain uniform distribution of helically-wound loops of the spiral of each pivotally-interconnected integral unit during linear travel of the belt and to facilitate orderly return of each such loop to its recessed crimped location upon exit from such relative-movement collection of belt components due to travel in a helically-curved path, and preselecting the gage of metal wire for the connector rod and spiral components in coordination with preselection of the major axis dimension for the helically-wound loops of the spirals such that the desired number of connector rods per linear foot of belt length can be selected such that the woven-wire belt being assembled is capable of desired collection of such lengthwise adjacent integral units in order to establish tensile stress in the outer perimeter of such belt during such helically-curved travel.

8. Assembly method for a helically-curved path structure for use with the woven-wire belt of claim 5, comprising the steps of:

establishing a helically-curved support path for a woven-wire belt during travel around a rotatable cylindrical-configuration frictional-drive surface, with such belt support path being independent of such frictional drive structure, the radial dimension of such belt support path being selected to enable selection from a plurality of belt widths which enable desired lengthwise collection at the inner perimeter of belt in such helically-curved path while providing for introduction of tensile stress into the outer perimeter of the belt, so as to provide for dynamic-frictional drive contact along such inner perimeter of the belt, and to enable selective control of constrictive force on the inner perimeter of the belt for dynamic-frictional drive purposes in such helically-curved path by quantitative selection of tensile stress in the outer perimeter of such belt in such curved path.

9. The assembly method of claim 8, in which the belt support path is substantially-circular in a plane which is perpendicularly transverse to the axis of rotation of such rotatable drive structure, with such belt support path defining a plurality of levels, distributed at substantially uniformly-spaced heights, between an entrance level and an exit level in such helically-curved path, further including the steps of:

establishing a belt travel path for such woven-wire belt which is exterior to such helically-curved support path and extends between such entrance and exit levels so as to form, in combination with such helically-curved path, an endless belt travel array;

providing support and lengthwise-directed drive means for belt travel in such exterior belt travel path, and providing control means for lengthwise-directed drive movement of belt into such exterior belt travel path so as to enable selection of lengthwise-directed tensile stress along the outer perimeter of such woven-wire belt while in such helically-curved support path.

10. Operating method for a travel array with a helically-curved support structure assembled in accordance with the method of claim 9, comprising controlling movement of the belt in such exterior belt travel path to establish desired lengthwise-directed tensile stress in the woven-wire belt so as to accommodate selection from a plurality of load-carrying capabilities for the belt in the helically-curved path, and controlling rotation of such rotatable cylindrical-configuration drive structure such that its drive surface periphery has a rate of movement which differs from the rate of movement of the inner perimeter surface of such belt in such helically-curved path.

11. Operating a curved-path support structure assembled in accordance with the method of claim 9, comprising providing means for controlling rate of movement of the cylindrical configuration drive surface so as to exceed the rate of movement of the inner perimeter of the woven-wire belt when in the helically-curved path, and selectively increasing tensile stress in the woven-wire belt for increasing weight loads of work product capable of being conveyed by such woven-wire belt when in such helically-curved path.

12. An elongated continuous-length woven-wire belt manufactured and fabricated in accordance with claim 1.

13. In combination, an elongated continuous-length woven-wire belt, a helically-curved path support structure, and belt support and drive means for belt travel when the belt is exterior to such helically-curved path as set forth in claim 9 for interrelated movement in an endless belt travel array and operation in accordance with claim 11.

14. Structure of claim 13, in which means, for selectively increasing tensile stress in such continuous-length woven-wire belt, is located in the belt travel path exterior to the helically-curved travel path.

* * * * *